(12) United States Patent
Hemani et al.

(10) Patent No.: US 10,373,394 B2
(45) Date of Patent: *Aug. 6, 2019

(54) METHOD AND APPARATUS FOR EMBEDDING A 2-DIMENSIONAL IMAGE IN A 3-DIMENSIONAL MODEL

(71) Applicant: Adobe Inc., San Jose, CA (US)

(72) Inventors: Mayur Hemani, New Delhi (IN); Abhishek Kumar, New Delhi (IN); Naveen Prakash Goel, Noida (IN)

(73) Assignee: ADOBE INC., San Jose, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/498,324

(22) Filed: Apr. 26, 2017

(65) Prior Publication Data

US 2017/0225399 A1 Aug. 10, 2017

Related U.S. Application Data

(63) Continuation of application No. 14/177,933, filed on Feb. 11, 2014, now Pat. No. 9,669,585.

(51) Int. Cl.
| | | |
|---|---|---|
| *G06F 19/00* | (2018.01) | |
| *G06T 19/20* | (2011.01) | |
| *B29C 64/386* | (2017.01) | |
| *G06T 7/70* | (2017.01) | |
| *B33Y 50/02* | (2015.01) | |
| *B33Y 10/00* | (2015.01) | |
| *B33Y 30/00* | (2015.01) | |
| *G05B 15/02* | (2006.01) | |

(52) U.S. Cl.
CPC ............ *G06T 19/20* (2013.01); *B29C 64/386* (2017.08); *G06T 7/70* (2017.01); *B33Y 10/00* (2014.12); *B33Y 30/00* (2014.12); *B33Y 50/02* (2014.12); *G05B 15/02* (2013.01); *G05B 2219/49023* (2013.01)

(58) Field of Classification Search
None
See application file for complete search history.

(56) References Cited

U.S. PATENT DOCUMENTS

| | | |
|---|---|---|
| 5,774,577 A | 6/1998 | Ueda et al. |
| 8,289,318 B1 | 10/2012 | Hadap et al. |
| 2004/0183796 A1 | 9/2004 | Velde et al. |
| 2005/0156825 A1 | 7/2005 | Baek |
| 2012/0215340 A1 | 8/2012 | Conrad |

(Continued)

FOREIGN PATENT DOCUMENTS

WO WO 2012-115441 A2 8/2012

OTHER PUBLICATIONS

Lee et al. ("Shape from Shading with a Linear Triangular Element Surface Model", IEEE Xplore, 1993).

(Continued)

*Primary Examiner* — Wissam Rashid
(74) *Attorney, Agent, or Firm* — Keller Jolley Preece (57) ABSTRACT

A computer implemented method and apparatus for embedding a 2D image in a 3D model. The method comprises generating a 3-dimensional (3D) print matrix representing a 2-dimensional (2D) image, wherein the print matrix comprises a plurality of sub-regions, the base plane of each sub-region angled with respect to a top surface of the print matrix so as to produce a plurality of shades, each shade representing a shade of the 2D image; and embedding the print matrix in a (3D) model.

20 Claims, 3 Drawing Sheets

(56) References Cited

U.S. PATENT DOCUMENTS

2012/0224755 A1    9/2012   Wu
2013/0095302 A1    4/2013   Pettis et al.
2013/0328228 A1   12/2013   Pettis et al.
2015/0224716 A1    8/2015   Hemani et al.

OTHER PUBLICATIONS

Marc Alexa et al., "Images from Self-Occlusion," Computational Aesthetics in Graphics, Visualization, and Imaging, 2011, 7 pgs.
Marc Alexa et al., "Irregular Pit Placement for Dithering Images by Self-Occlusion," Computers & Graphics 36, Mar. 3, 2012, pp. 635-641.
U.S. Appl. No. 14/177,933, Jul. 22. 2016, Office Action.
U.S. Appl. No. 14/177,933, Feb. 10, 2017, Notice of Allowance.

METHOD AND APPARATUS FOR EMBEDDING A 2-DIMENSIONAL IMAGE IN A 3-DIMENSIONAL MODEL

CROSS REFERENCE TO RELATED APPLICATIONS

The present application is a continuation of U.S. application Ser. No. 14/177,933, filed Feb. 11, 2014. The entire contents of the foregoing application are hereby incorporated by reference in its entirety.

BACKGROUND

Embodiments of the present invention generally relate to 3-dimensional (3D) printing and, more particularly, to a method and apparatus for embedding a 2-dimensional (2D) image in a 3D model using a single monochrome material Popularity of 3D printers, either for home printing use or via a remote service, has increased in recent times. Traditionally, a 2D image, such as a photo, is printed using a 2D printer. With the increase in popularity of 3D printers and 3D objects, a need for printing the 2D image on a 3D image has risen. In one approach, the 2D image is printed on a 3D printer with a material that may be of a different color than the color of the 3D printing material. In such approach, the 2D image is sculpted, not allowing for smooth shading of the 2D image. In another approach, the 2D image may be engraved onto the 3D object after the 3D object is printed. However, both approaches provide an undesirable result to the user who wants to combine the 2D image with the 3D model Therefore, there is a need for a method and apparatus for embedding a 2D image in a 3D model using a single monochrome material.

BRIEF SUMMARY

A method for embedding a 2D image in a 3D model is described. The method generates a 3-dimensional (3D) print matrix representing a 2-dimensional (2D) image, wherein the print matrix comprises a plurality of sub-regions, the base plane of each sub-region angled so as to produce a plurality of shades, where each shade represents a shade of the 2D image. The method then embeds the print matrix in a (3D) model In another embodiment, an apparatus for embedding a 2D image in a 3D model is described. The apparatus includes a print matrix generator for generating a 3-dimensional (3D) print matrix representing a 2-dimensional (2D) image, wherein the print matrix comprises a plurality of sub-regions, the base plane of each sub-region angled so as to produce a plurality of shades, each shade representing a shade of the 2D image. The apparatus also includes an embedding module for embedding the print matrix in a (3D) model.

In yet another embodiment, a computer readable medium for embedding a 2D image in a 3D model is described. The computer readable medium includes instructions to perform the method for embedding a 3D image in a 3D model.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 illustrates the processing of the 2D image into the print matrix, according to one or more embodiments While the method and apparatus is described herein by way of example for several embodiments and illustrative drawings, those skilled in the art will recognize that the method and apparatus for embedding a 2D image in a 3D model is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for embedding a 2D image in a 3D model defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

As previously explained existing solutions provide undesirable results, such as a lack of smooth shading of a 2D image on a 3D model or create the 2D image by processing the image after the 3D printing is complete.

Thus, in accordance with an embodiment of the present invention, techniques are disclosed for embedding a 2D image in a 3D model. A 2D image may be any digital image from any source, for example, a scanned photo, or a downloaded image from a user's personal images. The 2D image is made up of pixels of many different colors. Due to the fact that 3D printing material is monochromatic, the 2D image is processed in order to convert it to a monochromatic 2D image in a way that preserves significant details of the 2D image while removing extreme details. Significant details are details that are meaningful details to the appearance of the image. Extreme details are details that are not essential to represent the overall appearance of the image. More specifically, the 2D image is made monochromatic by applying a grayscale process to the 2D image. Applying the grayscale process converts the image to a black-and-white image that is composed exclusively of a plethora of shades of gray, varying in intensity from black to white. However, 3D printing material, due to its reflective properties may only be able to make visible, for example, four different shades of the gray. As such, further processing of the grayscale 2D image is required to convert it to a 2-bit image, i.e., an image made up of only four shades of gray.

The embodiments process the grayscale 2D image to reduce noise in the 2D image. Noise in the grayscale image is the plethora of shades of gray in the image. In order to reduce the number of shades of gray (i.e., remove the noise)

and also remove extreme details, a technique, for example, Gaussian blurring, may be applied to the grayscale 2D image. After the noise removal, the grayscale 2D image is reduced to four shades of gray, for example using a technique such as dithering. Dithering reproduces the 2D image using four shades of gray that are required to reproduce the 2D image using the 3D material. The dithering process produces a 2D image with a distribution of black pixels in varying density to make the image appear as though there are intermediate colors. The result is a 2-bit image (i.e., an image made up of four colors). The 2-bit image is associated with four shades of gray. The embodiments use the reflective properties of the 3D printing material at different angles to simulate the four shades of gray. A print matrix is created that represents the 2D image. The print matrix is a 2D rectangle divided into sub-regions. Each sub-region represents one or more pixels of the 2-bit image. The base plane of each sub-region is printed at one of four different angles. Each angle in the base plane of sub-regions of a print matrix represents one of the four shades of gray. For example, if each sub-region represents one pixel of the 2-bit image, the shade of gray of the pixel in the 2-bit image is translated into one of the four angles in the print matrix. The embodiments create a print matrix that represents the 2D image. In other words, when the 2D image is created using 3D printing material, the reflective properties of the 3D printing material at the four different angles produces the details of the 2D image. After the print matrix containing a representation of the 2D image is embedded on a surface of the 3D model, the 3D model is ready for printing.

Advantageously, the embodiments described herein can be employed to allow users to print 2D images on 3D models using monochrome material. The reflective properties of the material produce shades of color that are used to reproduce the 2D image.

Various embodiments of a method and apparatus for embedding a 2D image in a 3D model are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
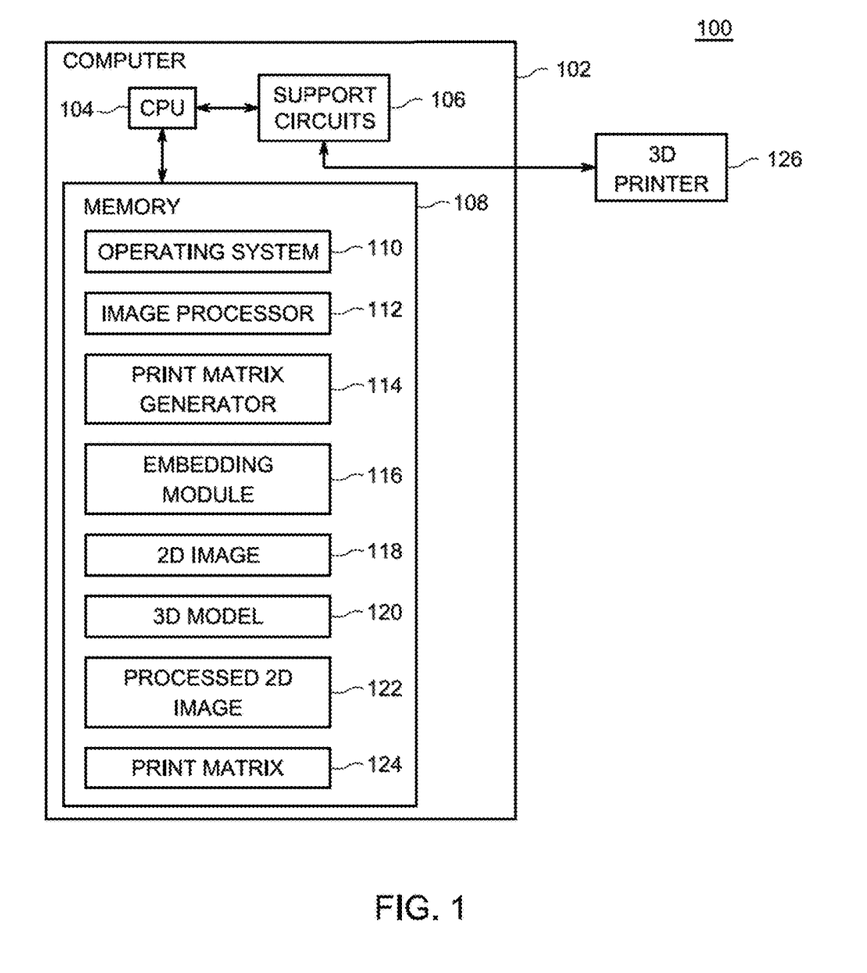
FIG. 1 is a block diagram of an apparatus for embedding a 2D image in a 3D model, according to one or more embodiments.

FIG. 1 is a block diagram of an apparatus 100 for embedding a 2D image in a 3D model, according to one or more embodiments. The apparatus 100 includes a computer 102. The computer 102 is a computing device, for example a desktop computer, laptop, tablet computer, and the like. The computer 102 includes a Central Processing Unit (CPU) 104, support circuits 106, and a memory 108. The computer 102 may be connected to a 3D printer 126. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, an image processor 112, a print matrix generator 114, an embedding module 116, a 2D image 118, a 3D model 120, a processed 2D image 122, and a print matrix 124. The operating system 110 may include various commercially known operating systems.

When a user wishes to print a 3D model 120 to include a 2D image 118, the user submits the 3D model 120 and the 2D image 118 to the image processor 112. The 2D image 118 may be any digital image on the computer 102. The 3D model 120 may be any file representing a 3D model 120. The image processor 112 may be a software plug-in or extension to existing printer software or an Application Programming Interface (API) for a 3D printer 126. Alternatively, the image processor 112 may be a plug-in for 3D model creation software tools. The image processor 112 accesses the 2D image 118. The 2D image 118 may be made up of pixels of a plurality of colors. Due to the fact that 3D printing material is monochromatic, the 2D image 118 is processed in order to convert it to a monochromatic 2D image in a way that preserves significant details of the 2D image 118 while removing extreme details. The 2D image 118 is made monochromatic by applying a grayscale process to the 2D image 118. Applying the grayscale process converts the image to a black-and-white image composed exclusively of shades of gray, varying in intensity from black to white. However, 3D printing material, due to its reflective properties may only be able to make visible, for example, four different shades of the gray. As such, further processing of the grayscale 2D image is required to convert 2D image 118 to a 2-bit image, in other words, an image made up of only four shades of gray.

The image processor 112 reduces noise in grayscale 2D image. Noise in the grayscale image is the varying shades of gray in the grayscale 2D image. In order to reduce the number of shades of gray (i.e., remove the noise) and also remove details, the image processor 112 applies a technique, for example, Gaussian blurring, to the grayscale 2D image. After the noise removal, the image processor 112 reduces the number of shades of gray in the grayscale 2D image using, for example a technique such as dithering. Dithering reproduces the 2D image using four shades of gray that are required to reproduce the 2D image 118 using the 3D material. Many 3D printers 126 use a 3D printing material that has reflexive qualities that are capable of showing only four different shades of gray. However, some 3D printers 126 use a 3D printing material that has reflexive qualities that are capable of showing eight different shades of gray. The type of 3D printer 126 is known at the time of processing the 2D image 118. As such, the number of different shades of gray produced by the dithering process is predefined. Although the present description describes a dithering process that reduces the grayscale 2D image to four shades of gray, it is appreciated by those of ordinary skill in the art that the dithering process may reduce the number of shades of gray based on the reflexive properties of the 3D printing material. The dithering process produces a 2D image using a distribution of black pixels in varying density to make the 2D image appear as though there are intermediate shades of gray. The result is a processed 2D image 122. The processed 2D image 122 is a 2-bit image (i.e., an image made up of four colors). The processed 2D image 122 is associated with four shades of gray. The reflective properties of the 3D printing material at different angles can be used to simulate the four shades of gray in the processed 2D image 122.

The print matrix generator 114 creates the print matrix 124 that represents the processed 2D image 122. The print matrix 124 is a 2D rectangle divided into sub-regions. Each sub-region represents one or more pixels of the processed 2D image 122. The base plane of each sub-region is printed at one of four different angles. The four angles are predefined based on the reflexive properties of the 3D printing material, for example, 20, 27, 36, and 45 degrees. Each angle in the base plane of sub-regions of the print matrix 124 represents one of the four shades of gray in the processed 2D image 122. For example, if each sub-region represents one pixel of the processed 2D image 122, the shade of gray of the pixel in the processed 2D image 122 is translated into one of the four angles in the print matrix 124. The print matrix generator 114 creates the print matrix 124 that represents the processed 2D image 122. In other words, when the processed 2D image 122 is created using 3D printing material, the reflective properties of the 3D printing material at the four different angles produces the details of the processed 2D image 122.

When the print matrix 124 is complete, the embedding module 116 determines an area on the surface of the 3D model 120. The embedding module 116 identifies a surface on the 3D model 120 that has at least the volume of the print matrix. Specifically, the surface on the 3D model 120 must be at least of the size of the print matrix and the depth of the print matrix. For example, the print matrix 124 for the 2D image 118 may be 5 cm by 5 cm by ½ cm deep. The surface on the 3D model 120 must have at least the same dimension or larger. In some embodiments, the area on the surface of the 3D model 120 is selected by a user via a user interface (not shown). In such embodiments, the user rotates the view of the 3D model 120 to an orientation that shows the area of the 3D model 120 where the user would like the 2D image 118 embedded. The user then draws, for example, a rectangle on the surface of the 3D model 120 to select the area where the user would like to have the 2D model 118 embedded. The volume of the 3D print matrix then replaces a volume at the area of the 3D model 120 with the volume of the 3D print matrix. The 3D model 120 is then ready to be printed using any method for printing on the 3D printer 126. The 3D model 120 is printed with the processed 2D image 122 embedded in the surface of the 3D model 120.

Figure 2:
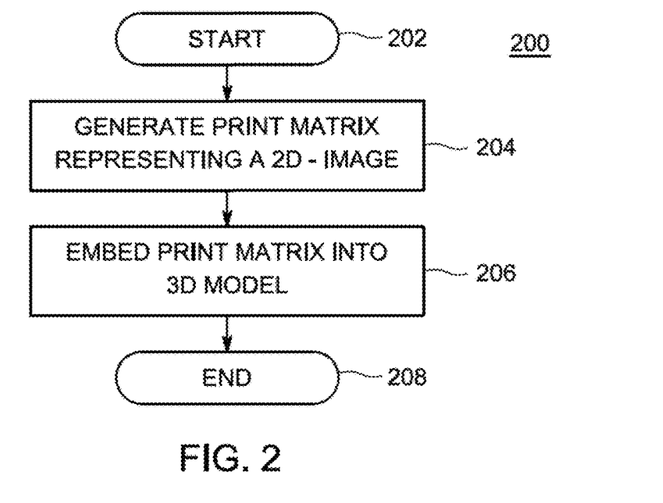
FIG. 2 depicts a flow diagram of a method for embedding a 2D image in a 3D model as performed by the image processor, print matrix generator, and embedding module of FIG. 1, according to one or more embodiments.

FIG. 2 depicts a flow diagram of a method 200 for embedding a 2D image in a 3D model as performed by the image processor 112, print matrix generator 114, and embedding module 116 of FIG. 1, according to one or more embodiments. The method 200 generates a print matrix that represents the 2D image and embeds the print matrix into a 3D model. The method 200 starts at step 202 and proceeds to step 204.

At step 204, the method 200 generates a 3D print matrix representing the 2D image as described in further detail with respect to FIG. 3 below. The method 200 then proceeds to step 206, where the method 200 embeds the 3D print matrix into the 3D model. The method 200 finds a surface on the surface of the 3D model that is large enough to hold the print matrix. For example, the print matrix may be 5 cm×5 cm and ½ cm thick. If a large enough surface does not exist on the surface of the 3D model, the method 200 downsizes the print matrix to fit an available area on the surface of the 3D model. In some embodiments, the area on the surface of the 3D model is selected by a user via a user interface. In such embodiments, the method 200 displays the 3D model. The user rotates the view of the 3D model to an orientation that shows the area of the 3D model where the user would like the 2D image embedded. The user then draws, for example, a rectangle on the surface of the 3D model to select the area where the user would like to have the 2D model embedded. The method 200 uses the selected area to hold the print matrix. The method 200 then subtracts a cuboid of the dimensions of the print matrix from the 3D model. The method 200 replaces the subtracted cuboid by performing a union of the print matrix with the 3D model. The result is a 3D print matrix representative of a 2D image embedded in the surface of a 3D model.

The method 200 proceeds to step 208 where the method 200 ends.

Figure 3:
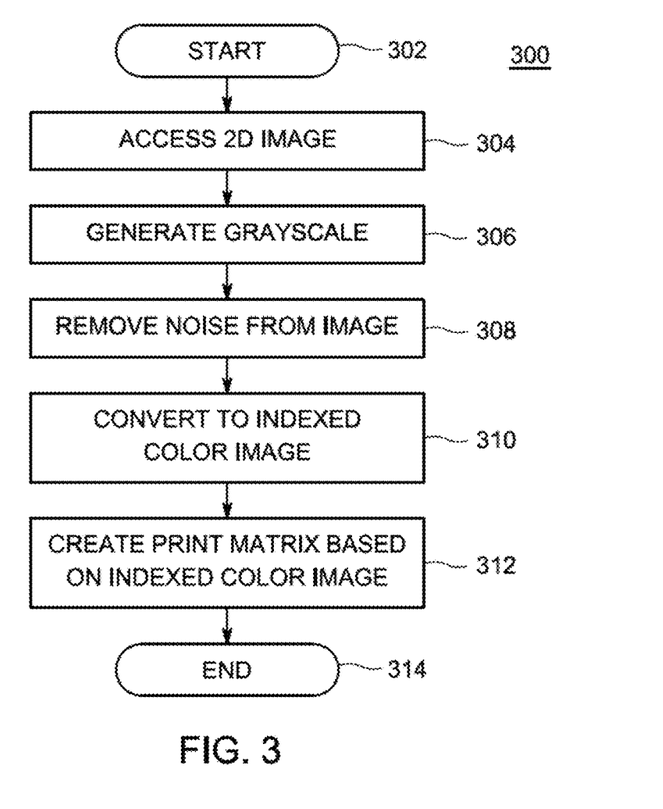
FIG. 3 depicts a flow diagram of a method for generating a print matrix as performed by the print matrix generator of FIG. 1, according to one or more embodiments.

FIG. 3 depicts a flow diagram of a method 300 for generating a print matrix as performed by the print matrix generator of FIG. 1, according to one or more embodiments. The method 300 processes a 2D image and generates a print matrix that represents the 2D image. The method 300 starts at step 302 and proceeds to step 304.

At step 304, the method 300 accesses the 2D image. The 2D image may be any digital image that includes color information for each pixel. The method 300 proceeds to step 306, where the method 300 generates a grayscale image of the 2D image. The grayscale digital image identifies an intensity value for each pixel in the 2D image. The grayscale image is composed exclusively of shades of gray, varying from black at the weakest intensity to white at the strongest intensity.

The method 300 proceeds to step 308, where the method 300 removes noise from the grayscale image. The method 300 removes extreme details of the grayscale image through, for example, Gaussian blurring. In order to ensure that primary images of the grayscale image are retained, the method 300 may perform selective blurring of low-gradient regions of the grayscale image.

The method 300 proceeds to step 310, where the method 300 converts the grayscale image to an indexed color image. The method 300 uses an error diffusion technique, such as dithering, to generate an indexed color image. The number of colors that are created by the error diffusion process is pre-determined based on the reflective properties of the printing material. The method 300 may generate a 2-bit image for a printing material that, due to its reflective qualities, is able to show four distinct shades of gray. The method 300 may generate a 3-bit image for a printing material that, due to its reflective properties, is able to show eight distinct shades of gray.

The method 300 proceeds to step 312, where the method 300 creates a 3D print matrix from the indexed color image. The method 300 creates a 3D print matrix that has a surface area the size of the 2D image. The method 300 then creates sub-regions in the print matrix. Each sub-region has its base plane raised at an angle. Due to the reflective properties of the printing material, by angling the base plane of a sub-region, the sub-region produces a shade. The angles are pre-defined based on the printing material. For example, for a 2-bit color image, four distinct angles are used to produce four distinct shades. In some embodiments, the base planes of the sub-regions may be printed at angles of 20, 27, 36, and 45 degrees with respect to a top surface of the print matrix to produce four distinct shades. Each sub-region is mapped to a pixel in the indexed color image and each shade is mapped to an angle. The method 200 creates the print matrix by defining an angle for each sub-region of the print matrix relative to the top surface of the print matrix. The result is a print matrix that reproduces the 2D image. The method 300 proceeds to step 314 and ends.

Figure 4:
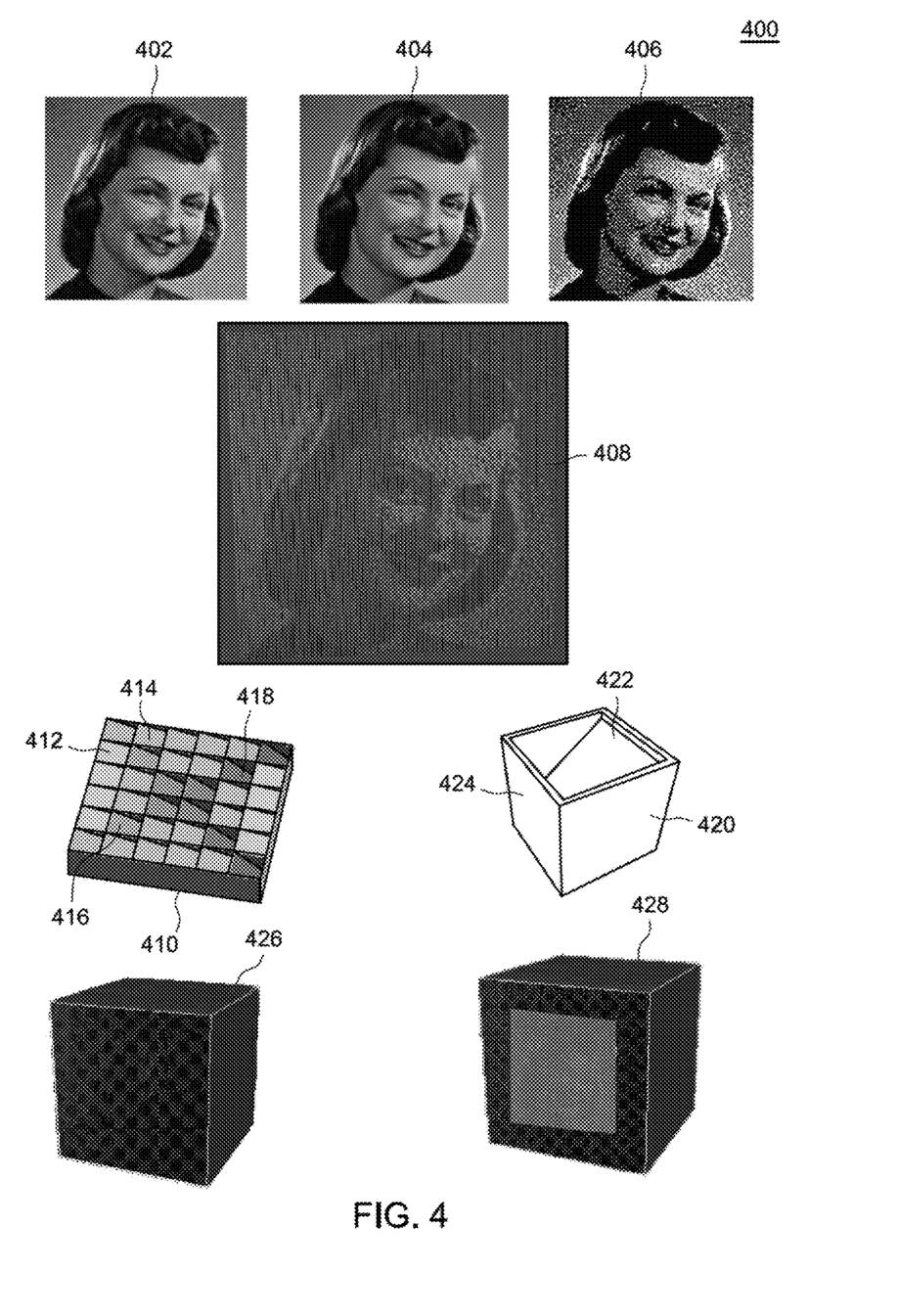

FIG. 4 illustrates the stages 400 of the processing of the 2D image into the print matrix, according to one or more embodiments. The input image 402 is a grayscale image. However, if the input image 402 was in color, the input image 402 is converted to grayscale. Noise removal is performed on the grayscale image 402 to remove extreme color values. The noise removal process produces a simplified image 404. Error diffusion is performed on the simplified image 404. The error diffusion process produces an indexed color image 406. In this illustrated example, the indexed color image 406 is a 2-bit color image. The four shades of gray in the 2-bit color image are associated with the angles of 20, 27, 36, and 45 degrees. A print matrix 408 is created by mapping each shade of gray to an angle. A sub-region is created for each pixel of the 2-bit color image 406. The base plane of each sub-region is angled with respect to the top surface of the print matrix 408 at an angle that corresponds to the shade of the corresponding pixel in the indexed color image 406. The result is the print matrix 408 that represents the 2D image. A sample area 410 of the print matrix 408 illustrates the effects of angling the base planes of the print matrix 408. Each sub-region 412, 414, 416, 418 has a base plane angled to produce a shade of an indexed color image. The sub-region 412 has a base plane angled at 20 degrees. The sub-region 414 has a base plane angled at 27 degrees. The sub-region 416 has a base plane angled at 36 degrees. The sub-region 418 has a base plane angled at 45 degrees. The varying degrees result in different shades. A single sub-region 420 is representative of a plurality of sub-regions that make up the print matrix 408. The base plane 422 of the sub-region 420 is angled at an angle 424 relative to the top surface of the print matrix 408 so as to produce a respective one of a plurality of shades of the indexed color image 406. The 3D model 426 is merely a box that may be printed on a 3D printer. The print matrix 408 is embedded in the surface of the 3D model 426 producing a 3D model with an embedded 2D image 428.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

We claim:

1. A computer implemented method of embedding 2-dimensional images into 3-dimensional models comprising:
   processing a 2-dimensional image using one or more of gray scaling, noise removal, or dithering;
   generating an indexed color image from the processed 2-dimensional image, the indexed color image comprising a pre-determined number of colors based on reflective properties of a 3-dimensional printing material;
   generating a 3-dimensional print matrix representing the 2-dimensional image, wherein the 3-dimensional print matrix comprises a plurality of sub-regions, a base plane of each sub-region angled so as to produce a respective one of a plurality of shades, each shade representing a color of the indexed color image; and
   embedding the 3-dimensional print matrix in a 3-dimensional model formed of the 3-dimensional printing material.

2. The method of claim 1, wherein each sub-region corresponds to one or more pixels of the 2-dimensional image, and wherein each angled base plane is printed at a respective one angle of a plurality of pre-defined angles.

3. The method of claim 1, wherein processing the 2-dimensional image comprises converting the 2-dimensional image into a grayscale image.

4. The method of claim 3, wherein generating the indexed color image from the processed 2-dimensional image comprises applying an error diffusion process to the grayscale image to reduce a number of colors in the grayscale image to a predetermined number of colors.

5. The method of claim 4, wherein generating the indexed color image from the processed 2-dimensional image comprises applying the error diffusion process to the grayscale image to convert the grayscale image into a 2-bit image consisting of four distinct gray colors.

6. The method of claim 1, wherein embedding the 3-dimensional print matrix in the 3-dimensional model comprises embedding the 3-dimensional print matrix in a flat surface of the 3-dimensional model.

7. The method of claim 1, wherein embedding the 3-dimensional print matrix in the 3-dimensional model comprises:
   determining an area on a surface of the 3-dimensional model that is greater than or equal in size and having a depth thereunder, of the size and depth of the 3-dimensional print matrix;
   removing the area and volume thereunder from the surface of the 3-dimensional model; and
   replacing the removed area and volume with the volume of the 3-dimensional print matrix.

8. An apparatus for embedding 2-dimensional images into 3-dimensional models comprising:
   at least one processor;
   a non-transitory computer-readable storage medium storing instructions thereon that, when executed by the at least one processor, cause the apparatus to:
      process a 2-dimensional image using one or more of gray scaling, noise removal, or dithering;
      generate an indexed color image from the processed 2-dimensional image, the indexed color image comprising a pre-determined number of colors based on reflective properties of a 3-dimensional printing material;
      generate a 3-dimensional print matrix representing the 2-dimensional image, wherein the 3-dimensional print matrix comprises a plurality of sub-regions, a base plane of each sub-region angled so as to produce a respective one of a plurality of shades, each shade representing a color of the indexed color image; and
      embed the 3-dimensional print matrix in a 3-dimensional model formed of the 3-dimensional printing material.

9. The apparatus of claim 8, wherein the instructions further cause the apparatus to process the 2-dimensional image by converting the the 2-dimensional image into a grayscale image.

10. The apparatus of claim 8, wherein the instructions further cause the apparatus to generate the indexed color image from the processed 2-dimensional image by applying an error diffusion process to the processed 2-dimensional image to reduce a number of colors in the processed 2-dimensional image to a predetermined number of colors.

11. The apparatus of claim 8, wherein the instructions further cause the apparatus to generate the indexed color image from the processed 2-dimensional image by applying an error diffusion process to the processed 2-dimensional image to convert the processed 2-dimensional image into a 3-bit image consisting of eight colors.

12. The apparatus of claim 8, wherein embedding the 3-dimensional print matrix in the 3-dimensional model comprises embedding the 3-dimensional print matrix in a flat surface of the 3-dimensional model.

13. The apparatus of claim 8, wherein embedding the 3-dimensional print matrix in the 3-dimensional model comprises:
   determining an area on a surface of the 3-dimensional model that is greater than or equal in size and having a depth thereunder of the size and depth of the 3-dimensional print matrix;
   removing the area and volume thereunder from the surface of the 3-dimensional model; and
   replacing the removed area and volume with the volume of the 3-dimensional print matrix.

14. A non-transitory computer readable medium for storing computer instructions that, when executed by at least one processor causes the at least one processor to perform a steps comprising:
processing a 2-dimensional image using one or more of gray scaling, noise removal, or dithering;
generating an indexed color image from the processed 2-dimensional image, the indexed color image comprising a pre-determined number of colors based on reflective properties of a 3-dimensional printing material;
generating a 3-dimensional print matrix representing the 2-dimensional image, wherein the 3-dimensional print matrix comprises a plurality of sub-regions, a base plane of each sub-region angled so as to produce a respective one of a plurality of shades, each shade representing a color of the indexed color image; and
embedding the 3-dimensional print matrix in a 3-dimensional model formed of the 3-dimensional printing material.

15. The non-transitory computer readable medium of claim 14, wherein each sub-region corresponds to one or more pixels of the 2-dimensional image, and wherein each angled base plane is printed at a respective one angle of a plurality of pre-defined angles.

16. The non-transitory computer readable medium of claim 14, wherein processing the 2-dimensional image comprises converting the 2-dimensional image into a grayscale image.

17. The non-transitory computer readable medium of claim 16, wherein generating the indexed color image from the processed 2-dimensional image comprises applying an error diffusion process to the grayscale image to reduce a number of colors in the grayscale image to a predetermined number of colors.

18. The non-transitory computer readable medium of claim 17, wherein generating the indexed color image from the processed 2-dimensional image comprises applying the error diffusion process to the grayscale image to convert the grayscale image into a 2-bit image consisting of four distinct gray colors.

19. The non-transitory computer readable medium of claim 14, wherein embedding the 3-dimensional print matrix in the 3-dimensional model comprises embedding the 3-dimensional print matrix in a flat surface of the 3-dimensional model.

20. The non-transitory computer readable medium of claim 14, wherein embedding the 3-dimensional print matrix in the 3-dimensional model comprises:
determining an area on a surface of the 3-dimensional model that is greater than or equal in size and having a depth thereunder, of the size and depth of the 3-dimensional print matrix;
removing the area and volume thereunder from the surface of the 3-dimensional model; and
replacing the removed area and volume with the volume of the 3-dimensional print matrix.

* * * * *